United States Patent
Park et al.

(10) Patent No.: US 11,909,040 B2
(45) Date of Patent: Feb. 20, 2024

(54) ELECTRODE ASSEMBLY

(71) Applicant: LG Chem, Ltd., Seoul (KR)

(72) Inventors: Su Han Park, Daejeon (KR); Seok Je Kim, Daejeon (KR)

(73) Assignee: LG Energy Solution, Ltd. (KR)

(*) Notice: Subject to any disclaimer, the term of this patent is extended or adjusted under 35 U.S.C. 154(b) by 818 days.

(21) Appl. No.: 16/963,081

(22) PCT Filed: Sep. 30, 2019

(86) PCT No.: PCT/KR2019/012745
§ 371 (c)(1),
(2) Date: Jul. 17, 2020

(87) PCT Pub. No.: WO2020/111490
PCT Pub. Date: Jun. 4, 2020

(65) Prior Publication Data
US 2020/0350583 A1 Nov. 5, 2020

(30) Foreign Application Priority Data
Nov. 29, 2018 (KR) .................. 10-2018-0151259

(51) Int. Cl.
*H01M 4/131* (2010.01)
*H01M 4/525* (2010.01)
(Continued)

(52) U.S. Cl.
CPC .......... *H01M 4/525* (2013.01); *H01M 4/505* (2013.01); *H01M 50/46* (2021.01);
(Continued)

(58) Field of Classification Search
CPC ...... H01M 4/525; H01M 4/505; H01M 50/46; H01M 50/531; H01M 2004/027;
(Continued)

(56) References Cited

U.S. PATENT DOCUMENTS 9,923,191 B2  3/2018  Kim
2006/0019153 A1  1/2006  Imachi et al.
(Continued)

FOREIGN PATENT DOCUMENTS

CN  1725549 A  1/2006
CN  101388449 A  3/2009
(Continued)

OTHER PUBLICATIONS

International Search Report for Application No. PCT/KR2019/012745 dated Jan. 3, 2020, 2 pages.
(Continued)

*Primary Examiner* — Cynthia K Walls
(74) *Attorney, Agent, or Firm* — Lerner David LLP

(57) ABSTRACT

An electrode assembly comprises: a negative electrode, a separator, and at least two or more positive electrodes which are stacked in the electrode assembly with the negative electrode and the separator, each of the positive electrodes including a positive electrode active material applied to a surface of a positive electrode collector, wherein the positive electrode active material contains nickel, cobalt, and manganese, and a first composition ratio of nickel, cobalt, and manganese in the positive electrode active material applied to a first one of the positive electrodes is different from a second composition ratio of nickel, cobalt, and manganese in the positive electrode active material applied to a second one of the positive electrodes. The first and second positive electrodes may be stacked to adequately improve thermal stability and capacity.

9 Claims, 6 Drawing Sheets

(51) Int. Cl.
*H01M 4/505* (2010.01)
*H01M 50/46* (2021.01)
*H01M 50/531* (2021.01)
*H01M 4/02* (2006.01)

(52) U.S. Cl.
CPC .... *H01M 50/531* (2021.01); *H01M 2004/027* (2013.01); *H01M 2004/028* (2013.01)

(58) Field of Classification Search
CPC .......... H01M 2004/028; H01M 4/131; H01M 10/052; H01M 10/0585; H01M 50/204; Y02E 60/10; Y02P 70/50
See application file for complete search history.

(56) References Cited

U.S. PATENT DOCUMENTS

| | | |
|---|---|---|
| 2010/0190081 A1 | 7/2010 | Park et al. |
| 2011/0123866 A1 | 5/2011 | Pan et al. |
| 2013/0143109 A1 | 6/2013 | Kim et al. |
| 2013/0196210 A1 | 8/2013 | Kim et al. |
| 2014/0030579 A1 | 1/2014 | Kim et al. |
| 2015/0132626 A1 | 5/2015 | Park et al. |
| 2016/0028062 A1 | 1/2016 | Kim |
| 2017/0155138 A1 | 6/2017 | Takaoka et al. |
| 2019/0074511 A1 | 3/2019 | Blangero et al. |
| 2019/0312262 A1 | 10/2019 | Morisawa et al. |

FOREIGN PATENT DOCUMENTS

| | | |
|---|---|---|
| CN | 103098285 A | 5/2013 |
| CN | 104393282 A | 3/2015 |
| CN | 104852043 A | 8/2015 |
| CN | 106328925 A | 1/2017 |
| CN | 106463780 A | 2/2017 |
| CN | 106981652 A | 7/2017 |
| CN | 108155362 A | 6/2018 |
| EP | 3107138 B1 | 4/2018 |
| JP | 2013134819 A | 7/2013 |
| JP | 2013534361 A | 9/2013 |
| JP | 2013543228 A | 11/2013 |
| JP | 2014071960 A | 4/2014 |
| JP | 2016025092 A | 2/2016 |
| JP | 2016178051 A | 10/2016 |
| JP | 2017063041 A | 3/2017 |
| JP | 2018174070 A | 11/2018 |
| JP | 2018533166 A | 11/2018 |
| KR | 20060122344 A | 11/2006 |
| KR | 20070118715 A | 12/2007 |
| KR | 20130026522 A | 3/2013 |
| KR | 20130102498 A | 9/2013 |
| KR | 20130139796 A | 12/2013 |
| KR | 20140120977 A | 10/2014 |
| KR | 20150054290 A | 5/2015 |
| KR | 20160012454 A | 2/2016 |
| WO | 2006113807 A2 | 10/2006 |
| WO | 2018123213 A1 | 7/2018 |

OTHER PUBLICATIONS

Extended European Search Report including Written Opinion dated Jan. 13, 2021 for Application No. EP19891447, 9 pages.
Search Report dated Jan. 5, 2023 from the Office Action for Chinese Application No. 201980006412.7 dated Jan. 13, 2023, pp. 1-3. [See p. 2, categorizing the cited references].

ELECTRODE ASSEMBLY

CROSS-REFERENCE TO RELATED APPLICATION

The present application is a national phase entry under 35 U.S.C. § 371 of International Patent Application No. PCT/KR2019/012745, filed on Sep. 30, 2019, published in Korean, which claims priority from Korean Patent Application No. 10-2018-0151259, filed on Nov. 29, 2018, the disclosures of which are hereby incorporated herein by reference in their entireties.

TECHNICAL FIELD

The present invention relates to an electrode assembly, and more particularly, to an electrode assembly in which two or more positive electrodes are stacked, and each positive electrode has a structure in which a positive electrode active material having a different composition ratio is applied to a positive electrode collector to simultaneously increase in charging/discharging capacity and thermal stability.

BACKGROUND ART

Batteries storing electrical energy may be generally classified into primary batteries and secondary batteries. Such a primary battery is a disposable consumable battery. On the other hand, such a secondary battery is a chargeable battery that is manufactured by using a material in which oxidation and reduction processes between current and the material are capable of being repeated. That is, when the reduction reaction to the material is performed by the current, power is charged, and when the oxidation reaction to the material is performed by the current, power is discharged. Here, such a charging-discharging is repeatedly performed.

Among various types of secondary batteries, lithium secondary batteries are generally manufactured by mounting an electrode assembly, in which a positive electrode, a separator, and a negative electrode are stacked, in a case. Here, a process, in which lithium ions are intercalated and deintercalated from lithium metal oxide to the negative electrode, is repeated to charge and discharge the lithium secondary batteries.

Figure 1A:
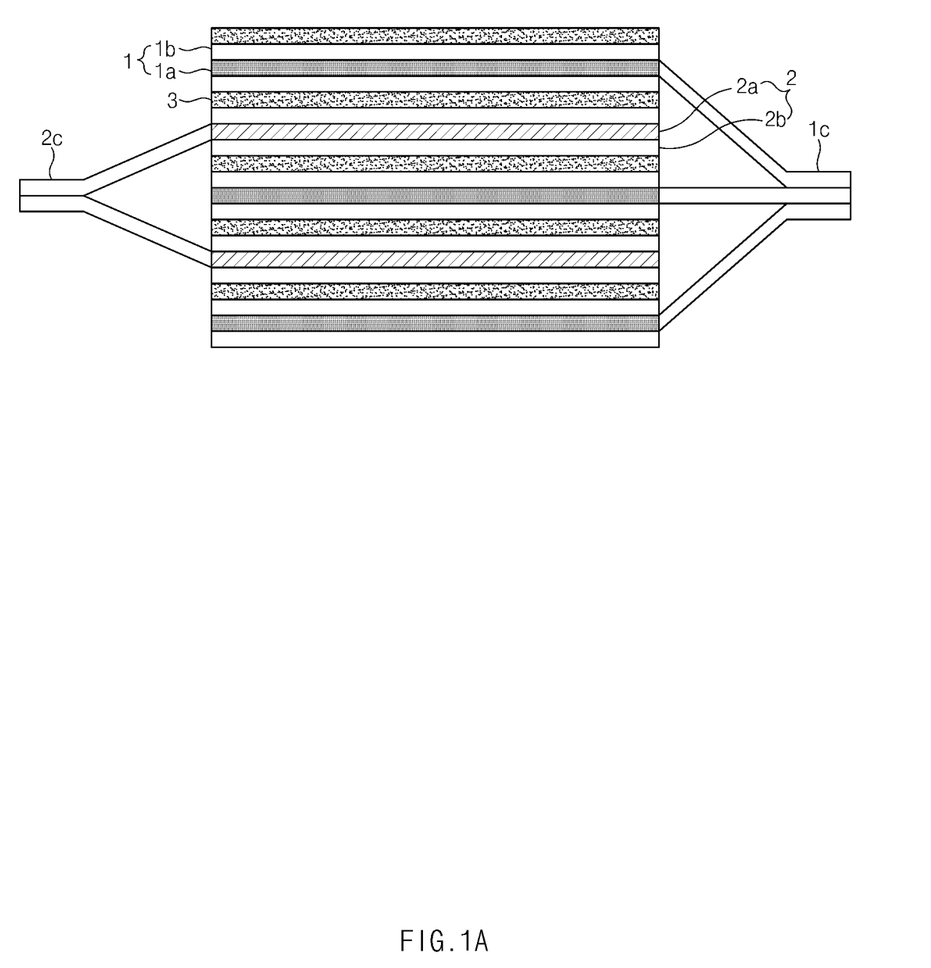
FIG. 1a is a side view of an electrode assembly according to a related art.

The electrode assembly may be manufactured so that a positive electrode 1/a separator 3/a negative electrode 2 are stacked repeatedly. The electrode assembly is accommodated in a can such as a cylindrical can or a prismatic case. As illustrated in FIG. 1A in which a side view of the electrode assembly is illustrated, the positive electrode 1 of the electrode assembly is coated with a positive electrode active material 1b on both surfaces of a positive electrode collector 1a, and the negative electrode 2 is coated with a negative electrode active material 2b on both surfaces of the negative electrode collector 2a. Here, a negative electrode tab 2c and a positive electrode tab 1c (which are expanded in a state in which the active materials are not applied) protrude from the negative electrode collector 2a and the positive electrode collector 1a in the negative electrode 2 and the positive electrode 1 so that current flows through the negative electrode tab 2c and the positive electrode tab 1c, respectively.

As demands for secondary batteries increase in fields such as energy storage system (ESS) and electric vehicles, research and development are being conducted to increase in capacity of secondary batteries.

Figure 1B:
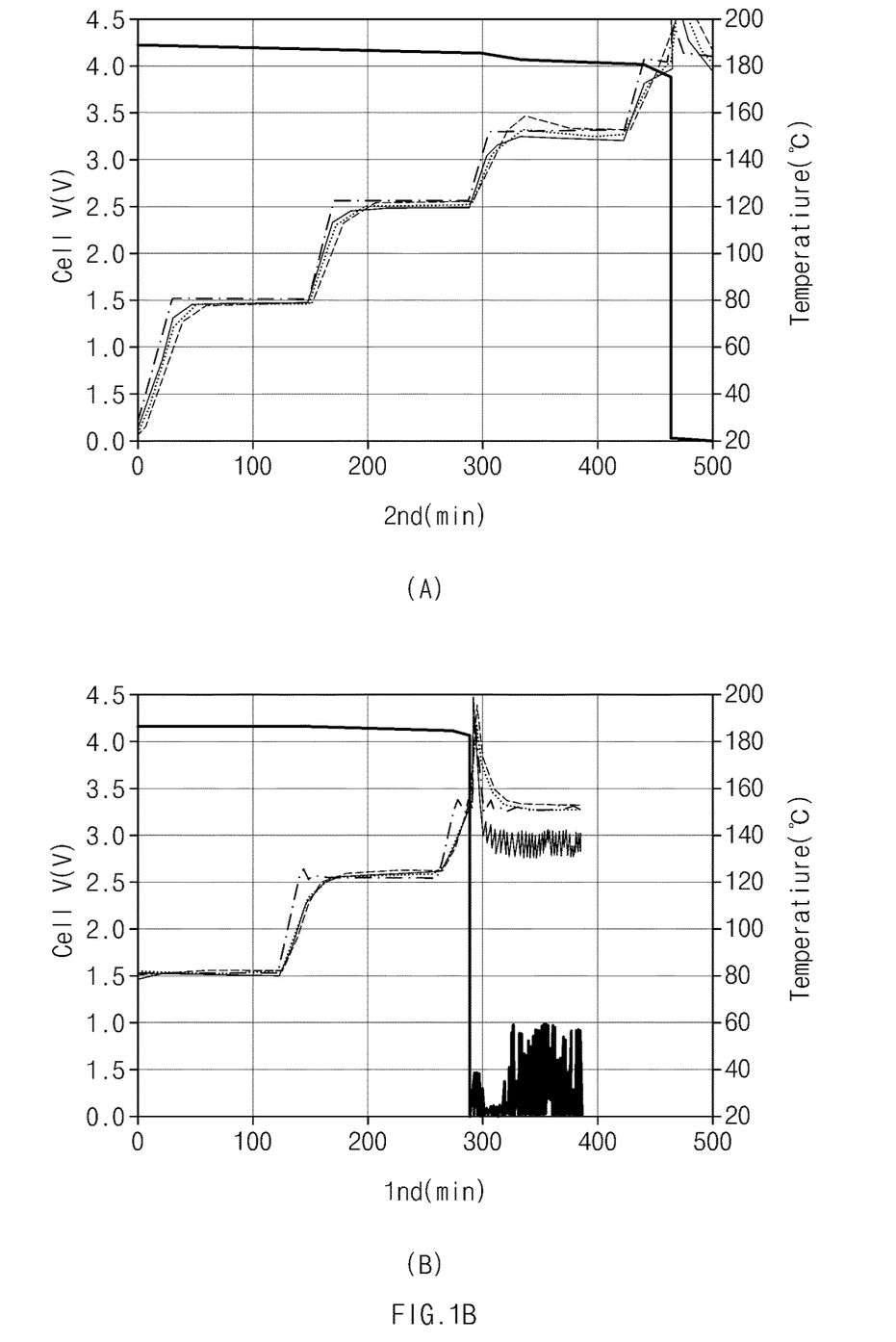
FIG. 1b is a graph illustrating a state in which thermal stability varies depending on a nickel content.

As a result, a secondary battery using an NCM (nickel (Ni), cobalt (Co), and manganese (Mn))-based positive electrode material has been developed. However, the NCM-based secondary battery has a problem that, when nickel content relatively increases, the capacity increases, but the thermal stability decreases, and thus, the possibility of ignition also increases. FIG. 1b is a graph illustrating a state in which the thermal stability varies depending on the nickel content. FIG. 1b(A) illustrates results of a thermal stability test of the electrode assembly coated with the positive electrode active material in which a composition ratio of nickel (Ni), cobalt (Co), and manganese (Mn) is 6:2:2, and FIG. 1b(B) illustrates results of a thermal stability test of the electrode assembly coated with the positive electrode active material in which a composition ratio of nickel (Ni), cobalt (Co), and manganese (Mn) is 8:1:1. The thermal stability test was performed by measuring a temperature change (a vertical axis) versus time (a horizontal axis) while heating is performed at a temperature of 80° C. to 200° C. at a rate of 2K/min. It is seen that both the electrode assemblies are ignited and damaged (at a point at which a cell voltage [Cell V] is zero; 460 minutes at which the cell voltage is zero in FIG. 1b(A), and 280 minutes at which the cell voltage is zero in FIG. 1b(B)), but the ignition more quickly occurs in the electrode assembly coated with the positive electrode active material having a composition ratio of 8:1:1 than the electrode assembly coated with the positive electrode active material having a composition ratio of 6:2:2. That is, it is seen that the thermal stability is deteriorated as the nickel content increases.

DISCLOSURE OF THE INVENTION

Technical Problem

Accordingly, the present invention is to provide a secondary battery that is capable of using a positive electrode active material having a high nickel content so as to improve capacity as well as thermal stability.

Technical Solution

According to the present invention for achieving the above object, an electrode assembly in which a positive electrode, a separator, and a negative electrode are repeatedly stacked comprises: at least two or more positive electrodes which are stacked in the electrode assembly and each of which has a structure in which a positive electrode active material is applied to a surface of a positive electrode collector, wherein the positive electrode active material contains nickel, cobalt, and manganese, and a composition ratio of nickel, cobalt, and manganese in the positive electrode active material applied to one positive electrode is different from that of nickel, cobalt, and manganese in the positive electrode active material applied to the other positive electrode.

According to the present invention, the positive electrode disposed at the relative outside in a stacking direction of the electrode assembly may be coated with a positive electrode active material containing a relatively small amount of manganese and a relative large amount of nickel, and the positive electrode disposed at the relative inside in the stacking direction of the electrode assembly may be coated with a positive electrode active material containing a relatively large amount of manganese and a relative small amount of nickel.

According to Embodiment 1 of the present invention, the positive electrode disposed at the relative outside in the stacking direction of the electrode assembly may be coated with a positive electrode active material in which nickel, cobalt, and manganese are contained at a ratio of 8:1:1, and the positive electrode disposed at the relative inside in the stacking direction of the electrode assembly may be coated with a positive electrode active material in which nickel, cobalt, and manganese are contained at a ratio of 1:1:1.

According to Embodiment 2 of the present invention, the positive electrode disposed at the relative outside in the stacking direction of the electrode assembly may be coated with a positive electrode active material in which nickel, cobalt, and manganese are contained at a ratio of 6:2:2, and the positive electrode disposed at the relative inside in the stacking direction of the electrode assembly may be coated with a positive electrode active material in which nickel, cobalt, and manganese are contained at a ratio of 1:1:1.

According to Embodiment 3 of the present invention, the positive electrode disposed at the relative outside in the stacking direction of the electrode assembly may be coated with a positive electrode active material in which nickel, cobalt, and manganese are contained at a ratio of 8:1:1, and the positive electrode disposed at the relative inside in the stacking direction of the electrode assembly may be coated with a positive electrode active material in which nickel, cobalt, and manganese are contained at a ratio of 6:2:2.

Also, the electrode assembly may have a structure in which three or more positive electrodes are stacked and comprise: one or more positive electrodes coated with a positive electrode active material in which nickel, cobalt, and manganese are contained at a ratio of 1:1:1; one or more positive electrodes coated with a positive electrode active material in which nickel, cobalt, and manganese are contained at a ratio of 6:2:2; and one or more positive electrodes coated with a positive electrode active material in which nickel, cobalt, and manganese are contained at a ratio of 8:1:1.

A positive electrode tab of the positive electrode coated with the positive electrode active material containing a relatively small amount of manganese and a relatively large amount of nickel and a positive electrode tab of the positive electrode coated with the positive electrode active material containing a relatively large amount of manganese and a relatively small amount of nickel may be disposed to be separated from each other.

A negative electrode tab disposed on the negative electrode in the electrode assembly may be disposed on one side, and the positive electrode tab is disposed on an opposite side, and the positive electrode tab of the positive electrode coated with the positive electrode active material containing the relatively small amount of manganese and the relatively large amount of nickel and the positive electrode tab of the positive electrode coated with the positive electrode active material containing the relatively large amount of manganese and the relatively small amount of nickel may be disposed to be spaced a predetermined distance from each other.

The electrode assembly having the above-described technical feature may be embedded in a case to provide a secondary battery, and the secondary battery may be provided in plurality, which are electrically connected to each other to provide a secondary battery module.

Advantageous Effects

According to the present invention having the technical characteristics as described above, the positive electrodes, in which the positive electrode active material has the different composition ratios of nickel, cobalt, and manganese, may be stacked to adequately improve the thermal stability and the capacity.

In more detail, the positive electrode active material containing a large amount of nickel to realize the high capacity may be disposed on the positive electrode disposed on the outside (the degradation may occur due to the relatively difficult heat dissipation), and the positive electrode active material containing a small amount of nickel to increase in thermal stability may be disposed on the positive electrode disposed on the inside to relatively improve the thermal stability and the capacity when compared to the case of using any kind of positive electrode.

Furthermore, the positive electrode tab of the positive electrode coated with the positive electrode active material containing the relatively large amount of nickel and the positive electrode tab of the positive electrode coated with the positive electrode active material containing the relatively small amount of nickel may be disposed to be separated from each other to additionally reduce the electrical resistance (because the current flows to be divided).

MODE FOR CARRYING OUT THE INVENTION

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly illustrate the present invention, parts that are not related to the description are omitted, and the same or similar components are denoted by the same reference numerals throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to an electrode assembly in which a positive electrode 10 (10', 10", and 10'''), a separator 30, and a negative electrode 20 are repeatedly stacked. Here, at least two or more positive electrodes 10 are stacked so that positive electrode active materials 10b applied to the positive electrodes 10 have different composition ratios.

In more detail, in the present invention, the positive electrode 10 is coated with the positive electrode active material 10b containing nickel, cobalt, and manganese. Here, a composition ratio of nickel, cobalt, and manganese in the positive electrode active material 10b applied to one positive electrode may be different from that of nickel, cobalt, and manganese in the positive electrode active material 10b applied to the other positive electrode.

Furthermore, according to the present invention, in order to improve thermal stability at an intermediate portion at which heat dissipation is difficult, the positive electrodes 10' and 10''' disposed at the relative outside in a stacking direction of the electrode assembly are coated with the positive electrode active material (a high Ni-based active material) containing a relatively small amount of manganese and a relative large amount of nickel, and the positive electrode 10'' disposed at the relative inside in the stacking direction of the electrode assembly is coated with the positive electrode active material (a low Ni-based active material) containing a relatively large amount of manganese and a relative small amount of nickel. Here, the amount of nickel is relatively determined.

Hereinafter, embodiments of the present invention will be described in detail with reference to the accompanying drawings.

First Embodiment

Figure 2A:
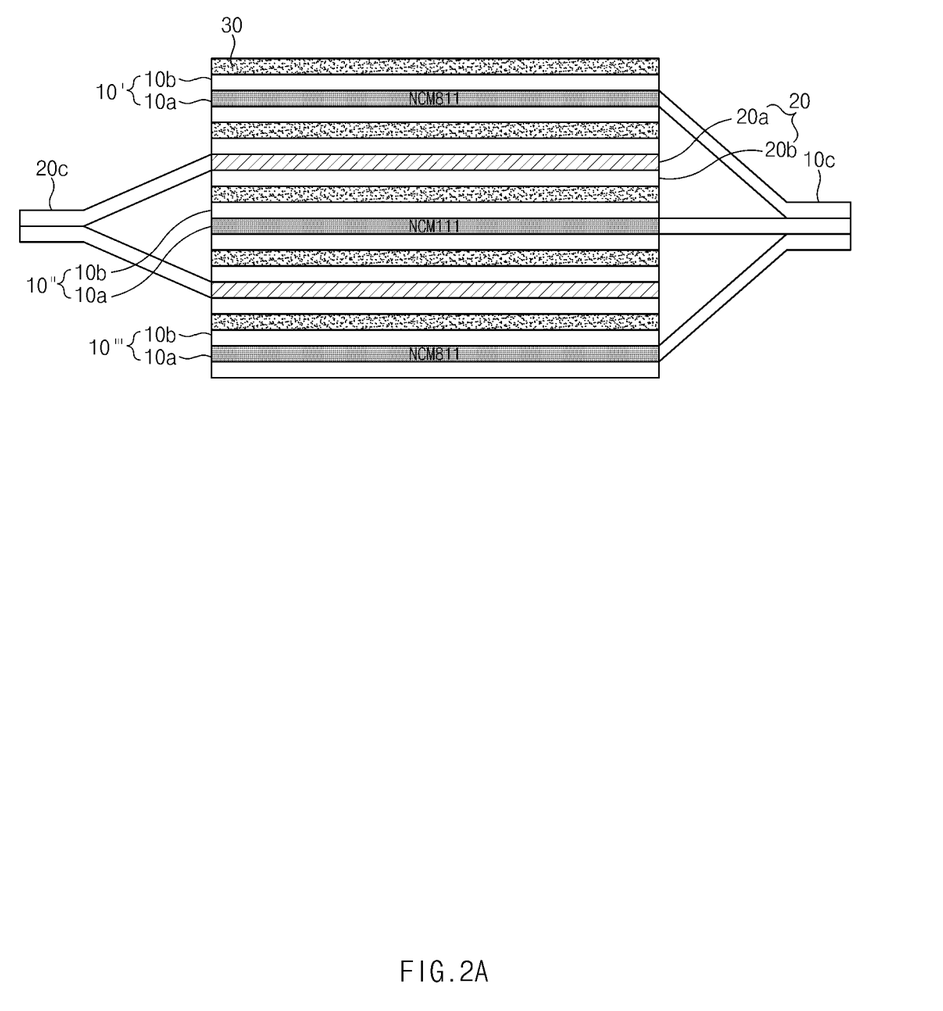
FIG. 2a is a side view illustrating an electrode assembly according to a first embodiment of the present invention.
Figure 2B:
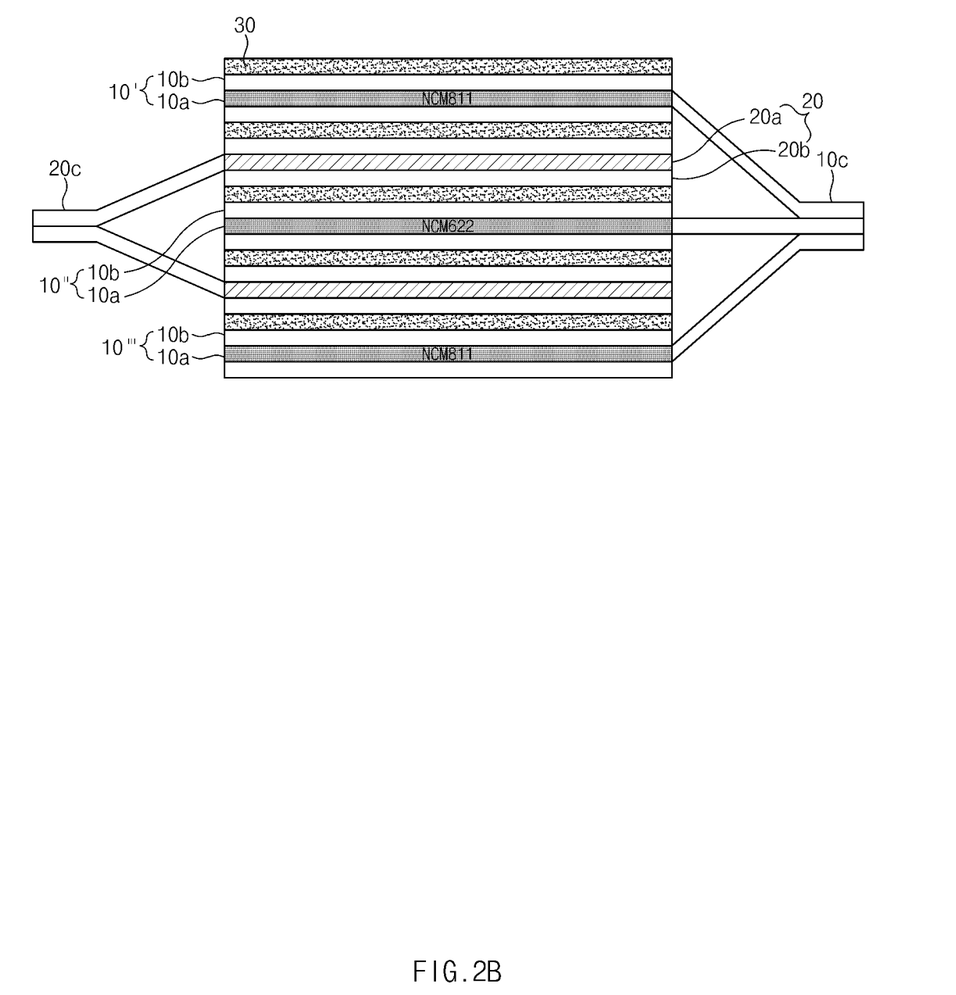
FIG. 2b is a side view illustrating an electrode assembly according to a second embodiment of the present invention.
Figure 2C:
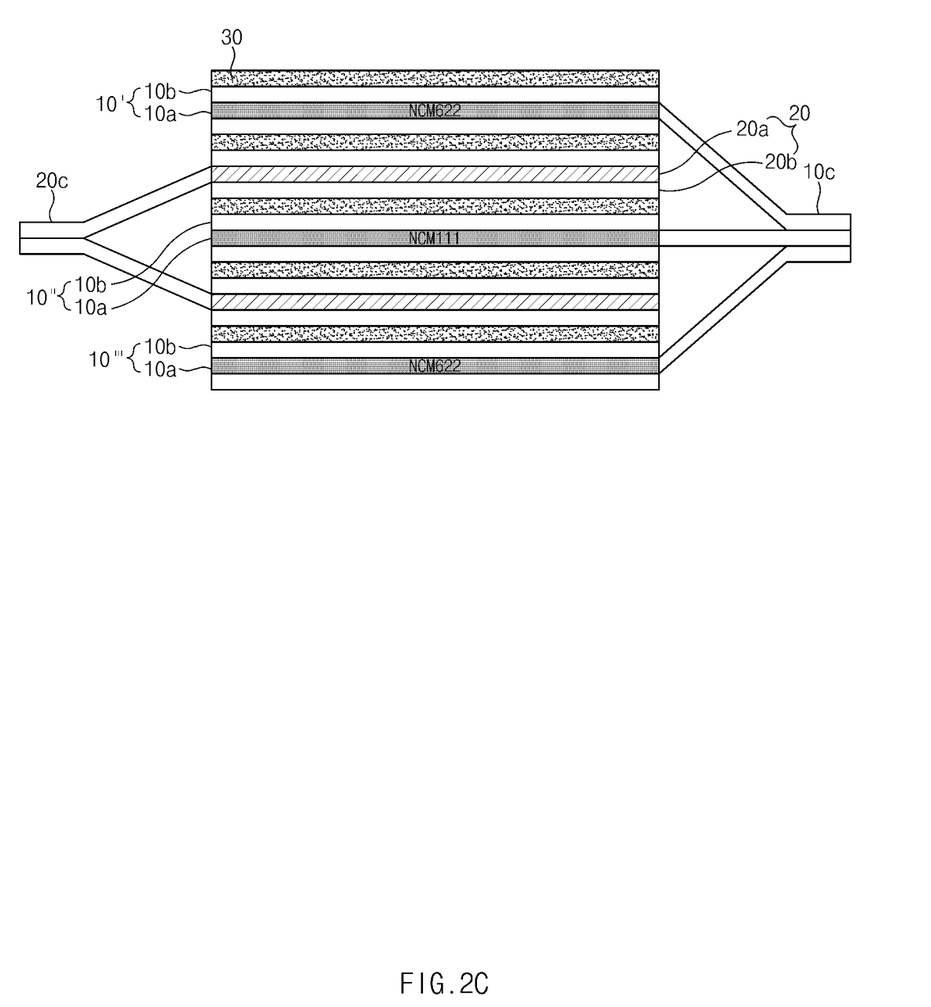
FIG. 2c is a side view illustrating an electrode assembly according to a third embodiment of the present invention.

Referring to FIG. 2a which illustrates a side view of an electrode assembly according to a first embodiment (for reference, although three positive electrodes are stacked in FIGS. 2a to 2c, three or more positive electrodes may be stacked), the electrode assembly according to this embodiment has a structure that is stacked downward in order of separator 30/positive electrode 10'/separator 30/negative electrode 20/separator 30/positive electrode 10''/separator 30/negative electrode 20/separator 30/positive electrode 10'''.

The negative electrode has a structure in which a negative electrode active material 20b is applied to both surfaces of a negative electrode collector 20a, and the positive electrode 10 (10', 10'', and 10''') has a structure in which a positive electrode active material 10b is applied to both surfaces of a positive electrode collector 10a. The positive electrode active material 10b is manufactured by containing lithium, cobalt, and manganese. Here, the positive electrodes disposed at the relative outside in a stacking direction of the electrode assembly, i.e., the first positive electrode 10' and the third positive electrode 10''', which are disposed downward from an upper side may have a structure in which nickel, cobalt, and manganese are contained at a ratio of 8:1:1. On the other hand, the positive electrode active material 10b of the positive electrode 10'' disposed at the relative inside in the stacking direction of the electrode assembly has a structure in which nickel, cobalt, and manganese are contained at a ratio of 1:1:1.

Second Embodiment

Referring to FIG. 2b which illustrates a side view of an electrode assembly according to a second embodiment, the electrode assembly according to this embodiment has a structure that is stacked downward in order of separator 30/positive electrode 10'/separator 30/negative electrode 20/separator 30/positive electrode 10''/separator 30/negative electrode 20/separator 30/positive electrode 10'''.

Similarly, the positive electrode active material 10b is manufactured by containing lithium, cobalt, and manganese. Here, the positive electrodes disposed at the relative outside in a stacking direction of the electrode assembly, i.e., the first positive electrode 10' and the third positive electrode 10''', which are disposed downward from an upper side may have a structure in which nickel, cobalt, and manganese are contained at a ratio of 8:1:1. On the other hand, the positive electrode active material 10b of the positive electrode 10'' disposed at the relative inside in the stacking direction of the electrode assembly has a structure in which nickel, cobalt, and manganese are contained at a ratio of 6:2:2.

The electrode assembly according to this embodiment has a configuration that focuses on increasing capacity rather than thermal stability because a nickel content of the electrode assembly according to this embodiment is slightly more than that of the electrode assembly according to the first embodiment.

Third Embodiment

Referring to FIG. 2c which illustrates a side view of an electrode assembly according to a third embodiment, the electrode assembly according to this embodiment has a structure that is stacked downward in order of separator 30/positive electrode 10'/separator 30/negative electrode 20/separator 30/positive electrode 10''/separator 30/negative electrode 20/separator 30/positive electrode 10'''.

Similarly, the positive electrode active material 10b is manufactured by containing lithium, cobalt, and manganese. Here, the positive electrodes disposed at the relatively outside in a stacking direction of the electrode assembly, i.e., the first positive electrode 10' and the third positive electrode 10''', which are disposed downward from an upper side may have a structure in which nickel, cobalt, and manganese are contained at a ratio of 6:2:2. On the other hand, the positive electrode active material 10b of the positive electrode 10'' disposed at the relatively inside in the stacking direction of the electrode assembly has a structure in which nickel, cobalt, and manganese are contained at a ratio of 1:1:1.

The electrode assembly according to this embodiment has a configuration that focuses on increasing thermal stability rather than capacity because a nickel content of the electrode assembly according to this embodiment is less than that of the electrode assembly according to each of the first and second embodiments.

For reference, in the electrode assembly according to the present invention, three or more positive electrodes may be stacked. Thus, three kinds of positive electrodes having different compositions of nickel, cobalt, and manganese may be stacked.

In this case, it is preferable that the positive electrode coated with the positive electrode active material having a low nickel content is disposed at the inside in which heat dissipation is relatively difficult, and the positive electrode coated with the positive electrode active material having a high nickel content is disposed at the outside in which the heat dissipation is relatively easy. For example, it is assumed that five positive electrodes are stacked downward from the upper side, positive electrodes coated with the positive electrode active material in which nickel, cobalt, and manganese are contained at a ratio of 8:1:1 may be respectively provided as first and fifth positive electrodes that are the outermost positive electrodes, positive electrodes coated with the positive electrode active material in which nickel, cobalt, and manganese are contained at a ratio of 6:2:2 may be provided as second and fourth positive electrodes, and a positive electrode coated with the positive electrode active material in which nickel, cobalt, and manganese are contained at a ratio of 1:1:1 may be provided as a third positive electrode (having relatively the lowest nickel content).

In the electrode assembly configured as described above, it is preferable that the positive electrodes 10 having the same composition ratio are electrically connected to each other. That is, since electrical conductivity of the positive electrode active material 10b are changed also as the composition ratio varies, it is preferable that the positive electrodes having different composition ratios are disposed to be separated from each other. When the positive electrode tabs are divided according to the composition ratios, current may flow to be divided. Thus, cell damage may be minimized to increase in lifespan of the battery. Also, the positive electrode having relatively high thermal stability may be charged by applying high current, and the positive electrode having relatively low thermal stability may be charged by applying low current.

Figure 3:
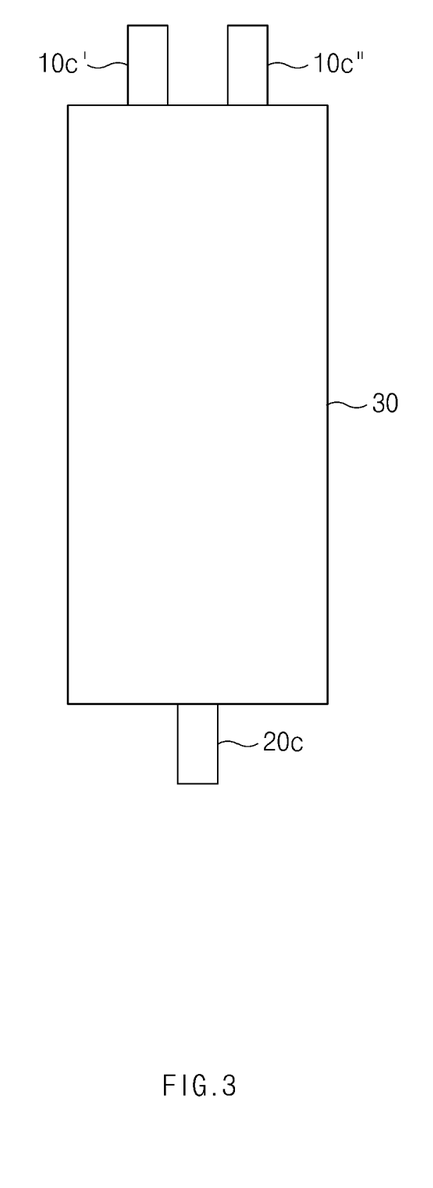
FIG. 3 is a plan view of an electrode assembly according to the present invention.

Referring to FIG. 3, which illustrates a plan view of the electrode assembly according to the present invention, a positive electrode tab 10c' of a first positive electrode 10' and a positive electrode tab of a third positive electrode 10a''', which have the same composition ratio, may be bonded and connected to each other. On the other hand, a positive electrode tab 10c'' of the second positive electrode 10'' and a positive electrode tab 10c' of the first positive electrode 10', which have different composition ratios, may be disposed to be spaced apart from each other. Here, since the negative electrode tab 20c disposed on the negative electrode 20 in the electrode assembly is disposed on one side, the positive electrode tabs are disposed at intervals on the same side of an opposite side.

According to the present invention having the technical characteristics as described above, the positive electrodes, in which the positive electrode active material 10b has the different composition ratios of nickel, cobalt, and manganese, may be stacked to adequately improve the thermal stability and the capacity.

In more detail, the positive electrode active material containing a large amount of nickel to realize the high capacity may be disposed on the positive electrode disposed on the outside (the degradation may occur due to the relatively difficult heat dissipation), and the positive electrode active material containing a small amount of nickel to increase in thermal stability may be disposed on the positive electrode disposed on the inside to relatively improve the thermal stability and the capacity when compared to the case of using any kind of positive electrode.

Furthermore, the positive electrode tab of the positive electrode coated with the positive electrode active material containing the relatively large amount of nickel and the positive electrode tab of the positive electrode coated with the positive electrode active material containing the relatively small amount of nickel may be disposed to be separated from each other to additionally reduce the electrical resistance (because the current flows to be divided).

The electrode assembly having the above-described technical feature may be embedded in a case to provide a secondary battery, and a plurality of secondary batteries may be electrically connected to provide a secondary battery module.

While the embodiments of the present invention have been described with reference to the specific embodiments, it will be apparent to those skilled in the art that various changes and modifications may be made without departing from the spirit and scope of the invention as defined in the following claims.

The invention claimed is:

1. An electrode assembly, comprising:
   a negative electrode;
   a separator; and
   at least two or more positive electrodes which are stacked in the electrode assembly with the negative electrode and the separator, each of the positive electrodes including a positive electrode active material applied to a surface of a positive electrode collector,
   wherein the positive electrode active material contains nickel, cobalt, and manganese, and a first composition ratio of nickel, cobalt, and manganese in the positive electrode active material applied to a first one of the positive electrodes is different from a second composition ratio of nickel, cobalt, and manganese in the positive electrode active material applied to a second one of the positive electrodes,
   wherein the first positive electrode is disposed at an outside of the electrode assembly in a stacking direction and is coated with the positive electrode active material having the first composition ratio and containing a first amount of manganese and a first amount of nickel, the first amount of nickel being greater than the first amount of manganese,
   the second positive electrode is disposed at an inside of the electrode assembly in the stacking direction and is coated with the positive electrode active material having the second composition ratio and containing a second amount of manganese and a second amount of nickel, the first amount of nickel being greater than the second amount of nickel, and
   wherein the second composition ratio of nickel, cobalt, and manganese is within a ratio of 1:1:1 and 6:2:2.

2. The electrode assembly of claim 1, wherein the first composition ratio of nickel, cobalt, and manganese is 8:1:1, and the second composition ratio of nickel, cobalt, and manganese is 1:1:1.

3. The electrode assembly of claim 1, wherein the first composition ratio of nickel, cobalt, and manganese is 8:1:1, and the second composition ratio of nickel, cobalt, and manganese is 6:2:2.

4. The electrode assembly of claim 1, wherein the first composition ratio of nickel, cobalt, and manganese is 6:2:2, and the second composition ratio of nickel, cobalt, and manganese is 1:1:1.

5. The electrode assembly of claim 1, wherein a third one of the positive electrodes has a third composition ratio of nickel, cobalt, and manganese in the positive electrode active material applied thereto, the first positive electrode is disposed at a first outside end of the electrode assembly in the stacking direction, the third positive electrode is disposed at a second outside end of the electrode assembly in the stacking direction, the second composition ratio of nickel, cobalt, and manganese is 1:1:1; the first composition ratio of nickel, cobalt, and manganese is 6:2:2; and the third composition ratio of nickel, cobalt, and manganese is 8:1:1.

6. The electrode assembly of claim 1, wherein a first positive electrode tab of the first positive electrode and a second positive electrode tab of the second positive electrode are separated from each other in a lateral direction that is perpendicular to the stacking direction.

7. The electrode assembly of claim 6, wherein a negative electrode tab of the negative electrode is disposed at a first side of the electrode assembly, the first and second positive electrode tabs are disposed at a second side of the electrode assembly opposite from the first side, and the first positive electrode tab and the second positive electrode tab are spaced a predetermined distance from each other in the lateral direction.

8. A secondary battery in which the electrode assembly of claim 1 is embedded in a case.

9. A secondary battery module comprising a plurality of secondary batteries each as claimed in claim 8 that are electrically connected to each other.

* * * * *